US010389160B2

(12) United States Patent
Miller et al.

(10) Patent No.: US 10,389,160 B2
(45) Date of Patent: Aug. 20, 2019

(54) CAR CHARGER AND CRADLE WITH WIRELESS CHARGING CONNECTIVITY FOR HAND-HELD ELECTRONIC DEVICES

(71) Applicant: Halo International SEZC Ltd., Georgetown, Grand Cayman (KY)

(72) Inventors: Garold C. Miller, Glastonbury, CT (US); Nathan Daniel Weinstein, Glastonbury, CT (US)

(73) Assignee: HALO INTERNATIONAL SEZC LTD., Georgetown (KY)

( * ) Notice: Subject to any disclaimer, the term of this patent is extended or adjusted under 35 U.S.C. 154(b) by 0 days.

(21) Appl. No.: 15/297,232

(22) Filed: Oct. 19, 2016

(65) Prior Publication Data

US 2017/0110902 A1 Apr. 20, 2017

Related U.S. Application Data

(60) Provisional application No. 62/243,304, filed on Oct. 19, 2015.

(51) Int. Cl.
*H02J 7/00* (2006.01)
*H02J 7/02* (2016.01)
*H02J 50/10* (2016.01)

(52) U.S. Cl.
CPC ............ *H02J 7/025* (2013.01); *H02J 7/0044* (2013.01); *H02J 50/10* (2016.02)

(58) Field of Classification Search
CPC ......... Y02E 60/12; H02J 7/025; H02J 7/0044; H02J 50/10; H02J 7/0042; H02J 7/0045; H01F 38/14; Y02T 90/122; B60L 11/182; H01M 10/46; H01M 2/1022; H04B 1/3877; H04B 1/3883; H04M 1/04; H04M 1/12; H04M 1/6041
USPC .......................................... 320/108, 113–115
See application file for complete search history.

(56) References Cited

U.S. PATENT DOCUMENTS

| | | | |
|---|---|---|---|
| 5,988,572 | A | 11/1999 | Chivallier et al. |
| 6,073,901 | A | 6/2000 | Richter |
| D479,196 | S | 9/2003 | Shih |
| D522,843 | S | 6/2006 | Richter |
| D529,905 | S | 10/2006 | Richter |
| D544,487 | S | 6/2007 | Hussaini et al. |
| D559,227 | S | 1/2008 | Kim |
| D569,876 | S | 5/2008 | Griffin |
| D654,054 | S | 2/2012 | Kohte et al. |

(Continued)

*Primary Examiner* — Richard Isla
*Assistant Examiner* — Mohammed J Sharief
(74) *Attorney, Agent, or Firm* — McCormick, Paulding & Huber LLP

(57) ABSTRACT

A portable charger and cradle assembly is provided for holding and charging an electronic device from an internal battery or an external power source wirelessly or via direct connection between the electronic device and the assembly. The assembly has a cradle housing with a support surface against which the electronic device may be held for wireless charging, and a support member attached to the cradle housing for positioning the cradle and electronic device as desired. At the end of the support member, a power connection interface is provided for coupling with an external power source to provide a charge to the electronic device via the charger and cradle assembly. In alternate embodiments, mounting means, such as a clip, can be provided at the end of the support member for holding the assembly in place.

33 Claims, 9 Drawing Sheets

110
112
116
115

(56) References Cited

U.S. PATENT DOCUMENTS

D711,322 S 8/2014 McSweyn et al.
D712,394 S 9/2014 Booth et al.
D731,973 S 6/2015 Liu
D733,697 S 7/2015 Palan et al.
D750,612 S 3/2016 Chen
D753,643 S 4/2016 Kim et al.
2002/0176571 A1 11/2002 Louh
2002/0191782 A1 12/2002 Beger et al.
2006/0052144 A1* 3/2006 Seil .......................... H04B 1/38 455/575.1
2009/0186576 A1 7/2009 Peng
2010/0078536 A1* 4/2010 Galvin ................... F16M 11/40 248/231.51
2010/0294818 A1* 11/2010 LaFargue ............ B60R 11/0241 224/400
2011/0255226 A1 10/2011 Duncan Seil et al.
2011/0291614 A1* 12/2011 Yeh ......................... B60R 11/02 320/108
2013/0112838 A1 5/2013 Duncan Seil et al.
2013/0307470 A1* 11/2013 Watanabe ............... H02J 7/025 320/108
2014/0132206 A1* 5/2014 Zhu ......................... H02J 50/12 320/108
2015/0072555 A1* 3/2015 Riddiford ............ F16M 11/041 439/575

* cited by examiner

CAR CHARGER AND CRADLE WITH WIRELESS CHARGING CONNECTIVITY FOR HAND-HELD ELECTRONIC DEVICES

CROSS-REFERENCE TO RELATED APPLICATION

This application claims the benefit of U.S. Provisional Application No. 62/243,304, filed Oct. 19, 2015, which is incorporated herein by reference.

FIELD OF INVENTION

The present invention generally relates to a power charging apparatus and method, and more particularly relates to a portable car charger and cradle for holding and charging hand-held electronic devices in a variety of manners, including via direct connection or via wireless power transmission.

BACKGROUND OF THE INVENTION

Present day consumers typically own several electronic devices specifically designed for portability and on-the-go use, including, for example, a mobile phone or smart phone, a portable music player like an iPod® or an MP3 player, a tablet, a portable gaming unit, a camera, and the like. Each of these devices requires frequent recharging. Such electronic devices typically utilize a cable for connecting the device to a power source, such as a wall outlet, a car charger, an airplane charger, or a computer. However, a separate cable is usually required for each power source. Moreover, different electronic devices often utilize different connection ports and interfaces such that a single charging cable is not compatible with multiple devices. Accordingly, a tech-savvy consumer, with several electronic devices, will usually have multiple charging cables to keep track of. Even then, the consumer may be without sufficient power to recharge a phone due to bad weather or a power outage, or may not always be in a place where a power source is readily available, or even if so, may not have the appropriate cable or adapter available to use with a particular power source.

With traditional power sources, such as those noted above, it is often difficult to charge multiple devices at the same time, especially where each device requires a separate charging cable. For example, a car charger port may only handle a single cable at a time. Adaptor devices are available on the market for connecting multiple devices to a power source at the same time—for example, a two-to-one or three-to-one car charger splitter. However, such adapters are often only compatible with certain interfaces. Moreover, such adapters are separate from portable power sources and tend to be bulky.

Similarly, connection interface attachments are also available for adapting a charging cable for use with a variety of devices for recharging from a power source, each requiring a different interface connection. However, such attachments are usually separate small pieces, and therefore difficult to keep track of when not in use. Further, use of such attachments does not solve the problem presented by the need to charge multiple devices at the same time, from the same power source, as oftentimes, only one attachment can be used with a charging cable at a time.

Portable power chargers exist that permit recharging of electronic devices when a standard power source is not readily available. For example, portable power chargers are illustrated and described in co-pending U.S. application Ser. No. 13/571,992, filed Aug. 10, 2012, and Ser. No. 13/682,985, filed Nov. 21, 2012, which share common inventors with the present application and which are incorporated herein by reference. Some existing power charger devices usually cannot charge multiple devices at the same time, either due to limited capacity or connectivity options. Even if multiple devices may be attached to the power charger at the same time, the charger may prioritize how the devices are recharged—i.e., it will charge one device first and then the second, and so on. However, this approach takes a long time to recharge all devices and risks not having sufficient charge remaining in the charger for fully charging the second device.

Further, some portable charger devices will not permit recharging from the charger when the charger is itself being recharged or connected to an external power source. Such devices require the charger unit to be disconnected from a power source before a charge will be passed on to a device connected to the charger, or require the charger unit to be fully charged first before any device connected to the charger unit can then be recharged.

Wireless power chargers have been introduced to the market, especially for mobile electronic devices, that have provided additional approaches to recharging portable electronic devices. Such wireless power transmission devices have been developed in connection with wireless charging standardization efforts, including by the Wireless Power Consortium (WPC), which have led to the adoption of devices that permit recharging of electronic devices without the use of separate chargers for each device. More particularly, the WPC has introduced the Qi wireless charging standard. Qi, which translates to "vital energy," takes its name from the Chinese concept of intangible flow of power and utilizes magnetic coil induction to transmit a charge from a transmitter to a receiver via a magnetic field.

Commonly, a wireless power transmission device utilizing magnetic coil induction includes a charging mat that must be connected to an external power source, such as a wall socket or a car charger socket, in order to transmit power wirelessly. The charging mat includes a transmitter having a coil. When a current is passed through the transmitter coil, a magnetic field is generated and transmitted to an electronic device placed on the charging mat. Such a device, in order to be wirelessly charged via the charging mat, must include a receiver having a coil, typically connected to the internal battery of the electronic device. When the electronic device is placed on an energized charging mat in a particular location, the receiver receives the wirelessly transmitted power in the form of a magnetic field, which induces a voltage in the receiver coil that can be used to power the electronic device or charge the internal battery of such a device.

Various drawbacks of prior art wireless power chargers have been identified. For example, such wireless chargers are not easily portable and require connection to an external power source for operation. Such external power sources are often not readily available, which makes the charger useless for on-the-go use. Additionally, some charging mat designs are often too small to be able to charge more than one electronic device at the same time. As noted, some wireless charging mats require a device to be placed in a particular spot—e.g., a Qi spot—where the transmitter and receiver coils must be aligned in order for a charge to be transmitted. Increasing the size of the charging mat may be undesirable, as it may take up too much space or be aesthetically unpleasing.

In view of the foregoing, there is a need for a charger that can be used to charge a variety of electronic devices, including but not limited to smart phones, mobile phones, data tablets, music players, cameras, camcorders, gaming units, e-books, Bluetooth® headsets and earpieces, GPS devices, and the like, either individually or simultaneously in various combinations. Additionally, there is a need for such a charger that is portable, has a compact size, and is easy to use in various conditions and locations to charge one or more electronic devices simultaneously, including but not limited to in a house or office, a car or an airplane, as well as on-the-go, without compromising operation and performance. Still further, there is a need for a portable charger that can be recharged from an external power source, providing increase flexibility and convenience of use for the portable charger. Still further, there is a need for a portable charger that can recharge its internal battery from an external power source or a wireless charging device at the same time as an electronic device connected to the charger, either directly or wirelessly, is being recharged by or via the charger unit. Still further, there is a need for a portable charger unit in a compact size that has increased functionality for a user requiring a portable source of power. Accordingly, it is a general object of the present invention to provide a portable charger that improves upon conventional power chargers currently on the market and that overcomes the problems and drawbacks associated with such prior art chargers.

SUMMARY OF THE INVENTION

In accordance with the present invention, a portable car charger and cradle is provided for holding and charging hand-held electronic devices. In general, the cradle comprises a cradle housing for supporting the electronic device having a generally flat support surface against which the electronic device may be held, and a support member for supporting the cradle housing. A wireless transmitter is disposed within the cradle housing and is capable of transmitting a power to the electronic device when the device is being supported on the support surface of the cradle housing.

In an embodiment of the present invention, the cradle effectively comprises a car charger for electronic devices. In this regard, the cradle includes a car charger interface for engagement with a car charger socket and a charger pad/cradle for holding a hand-held electronic device. The car charger interface is preferable provided on the end of the support member. The cradle is provided with wireless power transmission components, such as a transmitter which can comprise at least one magnetic induction coil, for recharging an electronic device held by the cradle via wireless power transmission methods. The car charger interface and the cradle housing may further include power connection ports for connecting additional devices using standard charging cables. Still further, connector cables can be included as part of the cradle housing for additional connections between the charger and electronic devices in need of a charge.

In an additional embodiment of the present invention, the car charger includes an internal rechargeable battery unit for connecting to and recharging one or more electronic device, as necessary. With such a design, the charger can continue to recharge one or more electronic device, via wireless and direct connections, even while the main power source—namely, the car—is turned off.

In an additional embodiment of the present invention, the cradle housing includes a wireless receiver so that the internal rechargeable battery unit can be wirelessly recharged when in communication with an external wireless transmitting device.

In various embodiments of the present invention, the cradle may further comprise a controller or processing unit, which can control wireless and direct connectivity with the charger unit, keep track of the capacity level of the battery unit, store data or provide a conduit means by which data can be exchanged between electronic devices, such as between a smart phone and a computer. In this regard, the cradle includes an LED charge indicator, which can provide various information about the operability of the charger—for example, whether the charger is connected to an external power source providing power for charging, or if the charger includes an internal battery unit, what the power capacity of said battery unit is.

In one aspect of the present invention, as noted above, the support member is adapted to be coupled to an external power source, such as a car charger socket, so that, when the support member is coupled to the external power source, a charge is provided from the power source to the cradle, and more particularly, the wireless transmitter, either directly or via an internal rechargeable battery unit. In another aspect of the present invention, the support member has a first end attached to the cradle housing and a second end comprising mounting means, such as a charger interface, a clip, a magnet, a suction cup, a weighted base, or the like, for securing the second end of the support member to a surface.

In yet another aspect of the present invention, the cradle comprises a first arm and a second arm coupled to the cradle housing. The first and second arms are adapted for movement relative to the cradle housing for holding an electronic device when said device is being supported on the support surface of the cradle housing. This adjustment can either be up-and-down, wherein the arms move or slide within grooves formed in the lateral sides of the cradle housing, or in-and-out, wherein the arms move into and from clamping relationship relative to one another, or both so the cradle can accommodate electronic devices of varying shapes and sizes.

These and other objects, features and advantages of the present invention will become apparent in light of the detailed description of embodiments thereof, as illustrated in the accompanying drawings.

DETAILED DESCRIPTION OF THE DRAWINGS

Figure 1:
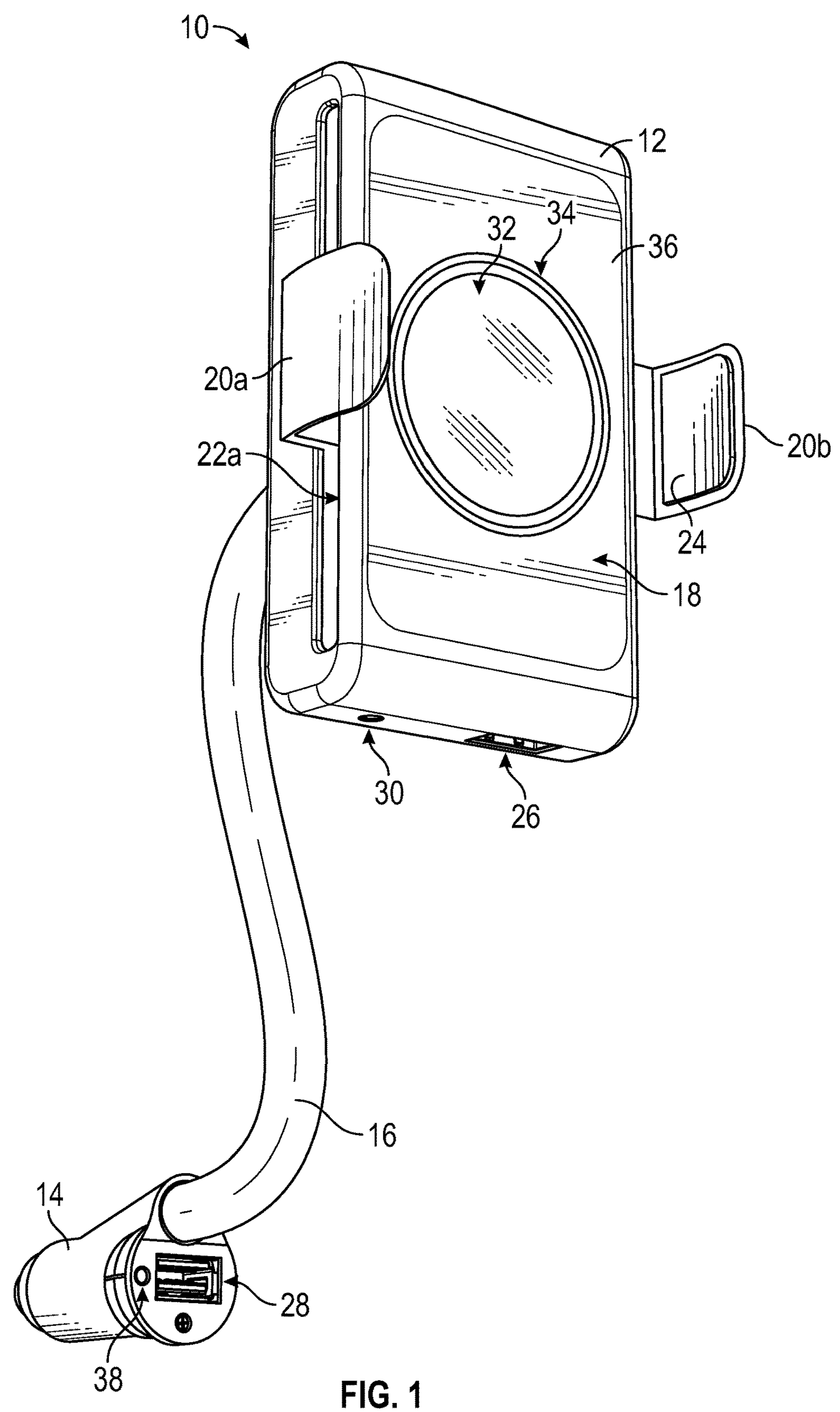
FIG. 1 shows a perspective view of a first embodiment of a portable charger and cradle assembly in accordance with the present invention.

A portable charger and cradle assembly in accordance with an embodiment of the present invention is shown in FIGS. 1-8 and generally designated by reference numeral 10. Referring to FIG. 1, the charger and cradle assembly 10 may generally include a rechargeable internal battery unit (not shown) disposed within a cradle housing 12 that is operatively connected to a car charger interface 14 disposed at the end of a support member 16 and adapted for engagement with a standard car charger socket for delivery of 12 Volt DC power from a car battery. The charger and cradle assembly 10 in accordance with this embodiment is designed for use in a car for holding and recharging hand-held electronic devices while driving, whereby the electronic device is wirelessly recharged simply by placing it on a support surface 18 provided on the cradle housing 12. For example, a phone can be placed on the cradle 10 and held by adjustable spring-biased clip-arms 20*a* and 20*b* and recharged using wireless power transmission components respectively included in the cradle 10 and the phone. The charger and cradle assembly 10 is also designed for portability and convenient on-the-go use to recharge one or more portable electronic devices, either by its wireless charging capabilities or via direct charging connection ports and/or charging cables, as described in more detail below.

As illustrated in FIG. 1, a car charger connection interface 14 is provided for engagement with a standard car charger socket. The cradle 10 is connected to the car charger interface 14 via a flexible gooseneck support member 16 which permits adjusting the position, angle and location of the cradle housing 12 once the car charger interface 14 is in engagement with the car charging socket.

Figure 3A:
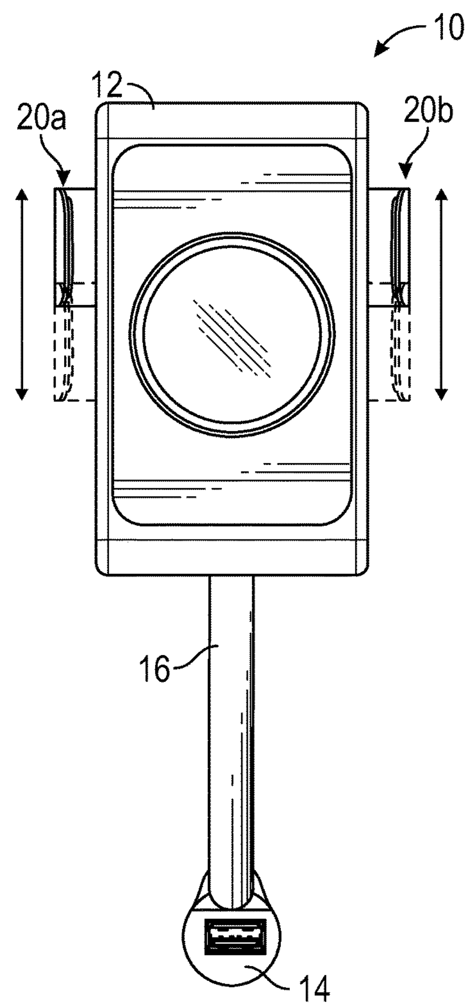
FIG. 3A illustrates up-and-down adjustment of first and second arms along the longitudinal length of the cradle housing for the portable charger and cradle assembly of FIG. 1.
Figure 3B:
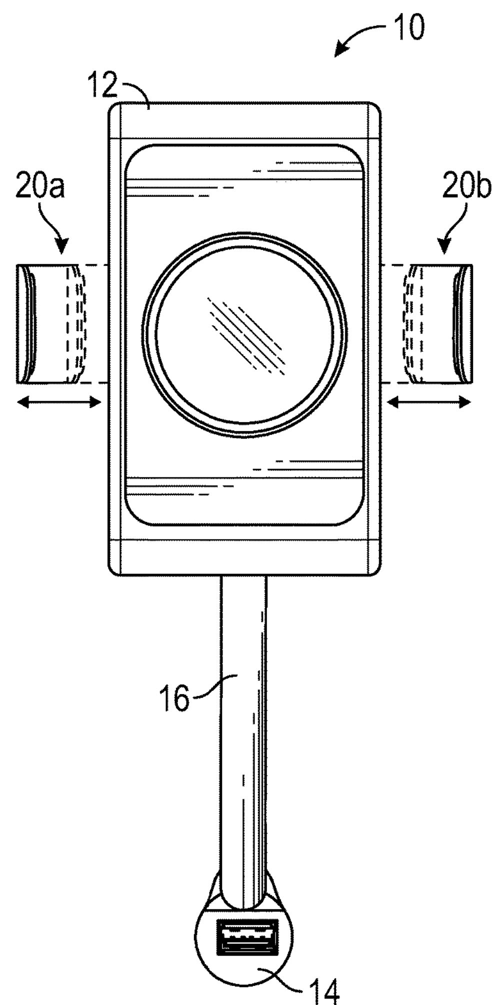
FIG. 3B illustrates in-and-out lateral adjustment of the first and second arms for the portable charger and cradle assembly of FIG. 1.
Figure 4:
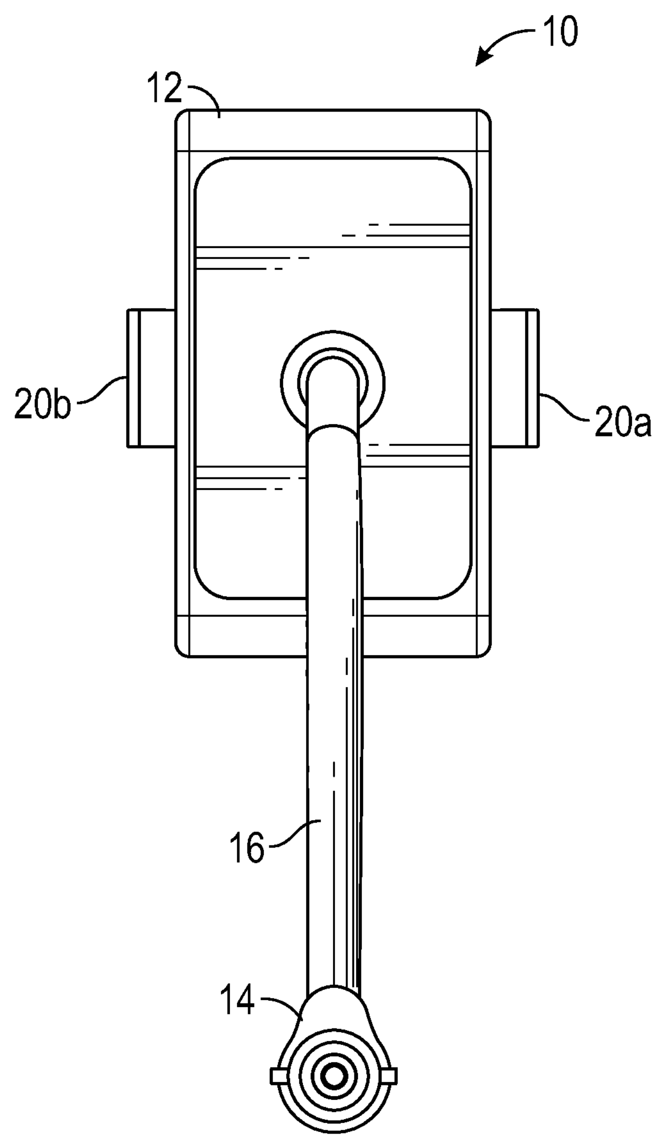
FIG. 4 shows a planar rear view of the portable charger and cradle assembly of FIG. 1.
Figure 5:
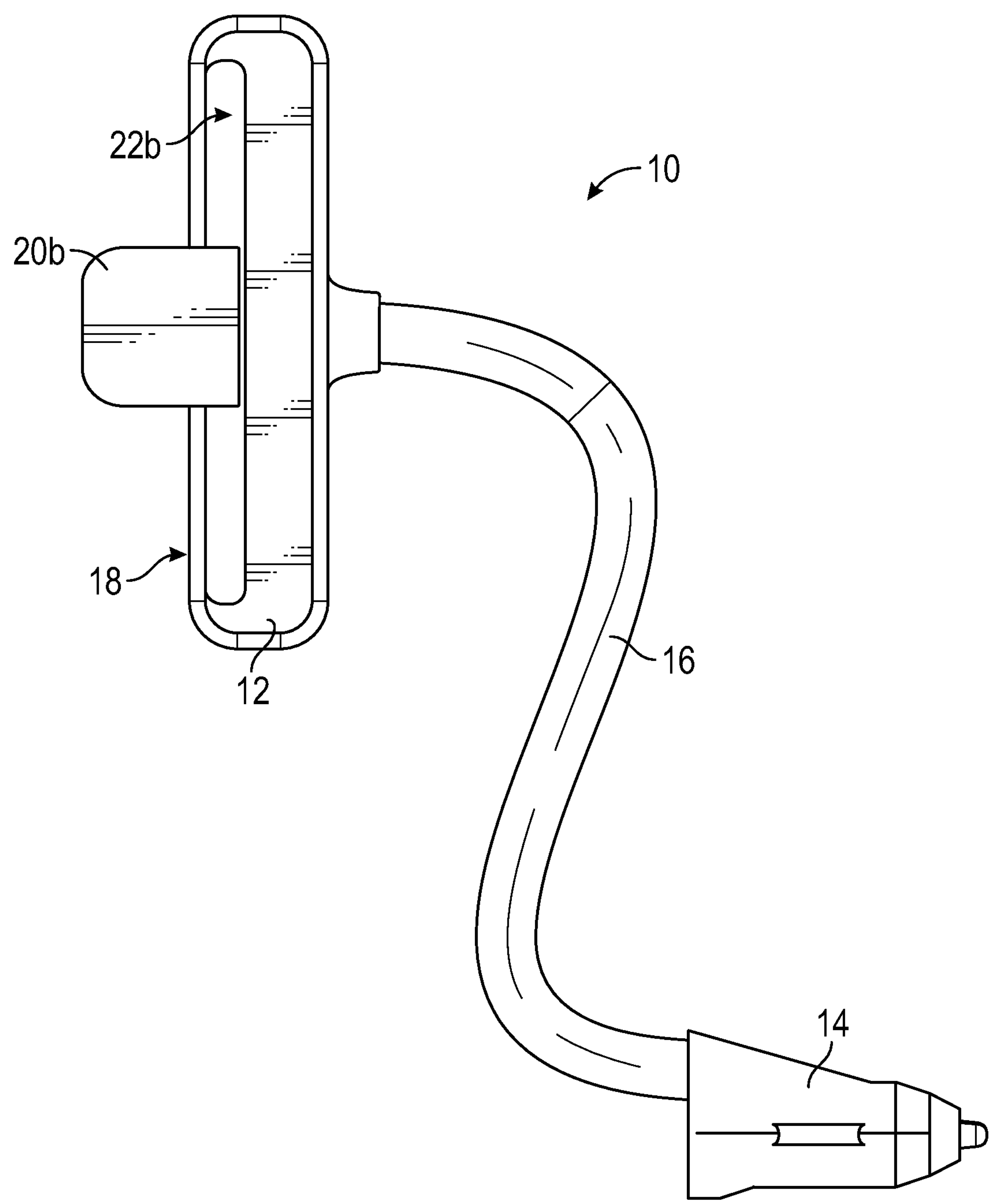
FIGS. 5 and 6 show planar side views of the portable charger and cradle assembly of FIG. 1.
Figure 6:
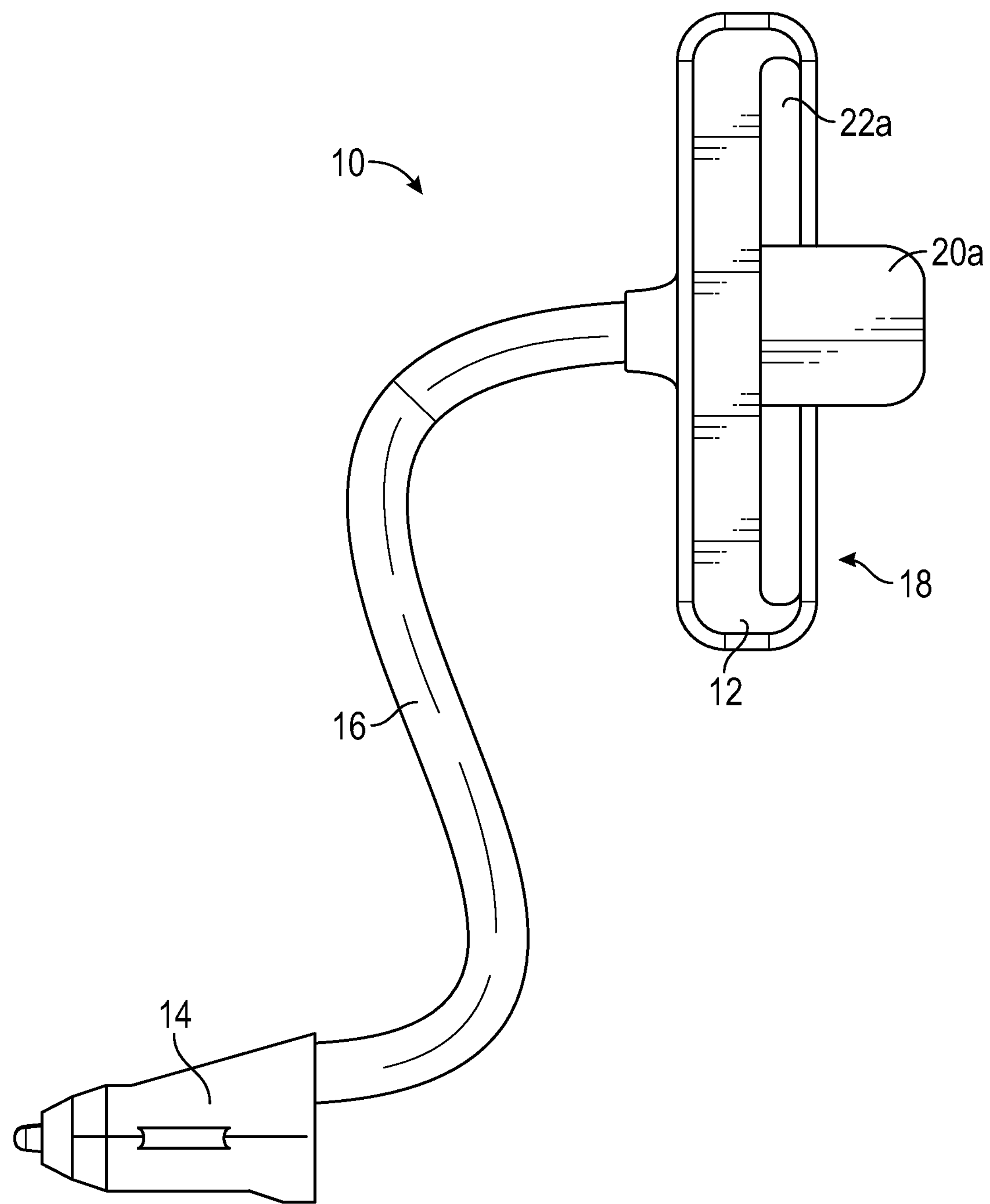

The cradle housing 12 includes spring-biased clip-arms 20*a* and 20*b* on each lateral side of the cradle housing 12 for holding an electronic device in place on the cradle housing 12. The clip-arms 20*a* and 20*b* can be slid within grooves or guide tracks 22*a* and 22*b*, as can be seen more clearly in FIGS. 5 and 6, up and down the lateral sides of the cradle housing 12 along the longitudinal length thereof to accommodate devices of varying shapes and sizes. The clip-arms 20*a* and 20*b* may also be moved into and from clamping relationship with one another, again to accommodate electronic devices of varying shapes and sizes. Indeed, FIG. 3A illustrates up-and-down adjustment of first and second arms 20*a* and 20*b* along the longitudinal length of the cradle housing 12, while FIG. 3B illustrates in-and-out lateral adjustment of the first and second arms 20*a* and 20*b*, with the original, centered position of the arms 20*a* and 20*b* being illustrated in hidden lines and adjustable movement being capable along the provided arrows. In alternate embodiments, the arms 20*a* and 20*b* may be moved both in-and-out and up-and-down.

Figures 7, 8:
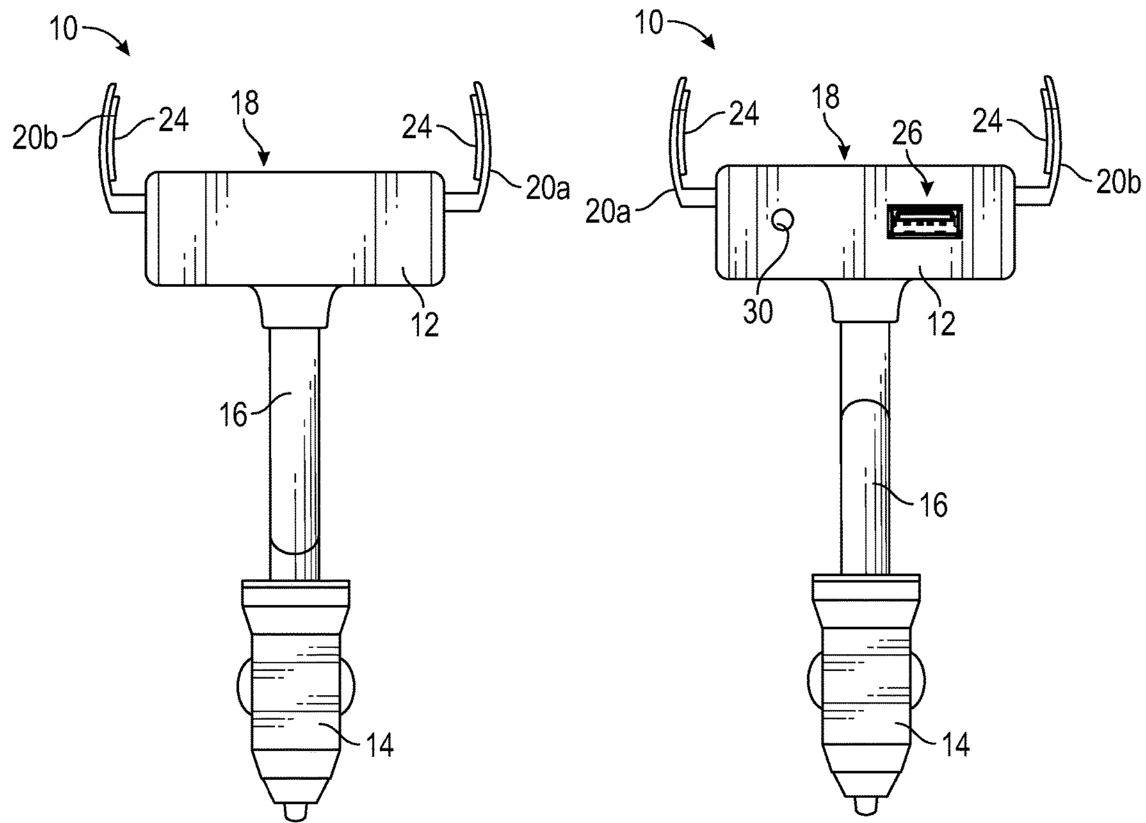
FIG. 7 shows a planar top view of the portable charger and cradle assembly of FIG. 1.
FIG. 8 shows a planar bottom view of the portable charger and cradle assembly of FIG. 1.

As shown in FIGS. 7 and 8, the clip-arms 20*a* and 20*b* are preferably arcuate in shape so as to grasp the sides of an electronic device. Pads 24 can be provided to improve the grip on the electronic device without risking damaging the device in any way. The clip-arms 20*a* and 20*b* can take and form or shape, as is previously known in the art, without departing from the spirit and principles of the present invention.

In preferred embodiments of the present invention, retaining means are provided for holding the clip-arms 20*a* and 20*b* in clamping relationship once their relative positions are set. In preferred operation, the clip-arms 20*a* and 20*b* may be separated, such as illustrated in FIG. 3B, so that an electronic device can be placed on the support surface 18 of the cradle housing 12. Once the electronic device is in place, the up-and-down position of the arms 20*a* and 20*b* can be adjusted, such as illustrated in FIG. 3A, and the lateral position of the arms 20*a* and 20*b* can be adjusted so that the arms 20*a* and 20*b* clamp the electronic device and secure it is its place so that it will not move while being wirelessly recharged. Preferably, the clip-arms 20*a* and 20*b* are spring biased towards the center of the cradle housing 12. They may also include a mechanical gear arrangement which controls the in-and-out motion of the arms 20*a* and 20*b* relative to one another so that they can be held or retained in a clamping relationship, as aided by the springs biasing the arms 20*a* and 20*b* towards the center. The arms 20*a* and 20*b* may be mounted within grooves 22*a* and 22*b* on the lateral sides of the cradle housing 12, whereby the entire arm assembly (gears and springs included) can be slid up and down the longitudinal length of the cradle housing 12 for adjustment. This movement may also be controlled by providing stop positions for the assembly along the longitudinal length of the grooves 22*a* and 22*b* so that the arm assembly does not freely slide up and down the cradle housing 12, especially when under the weight of an electronic device placed on the support surface 18.

Figure 2:
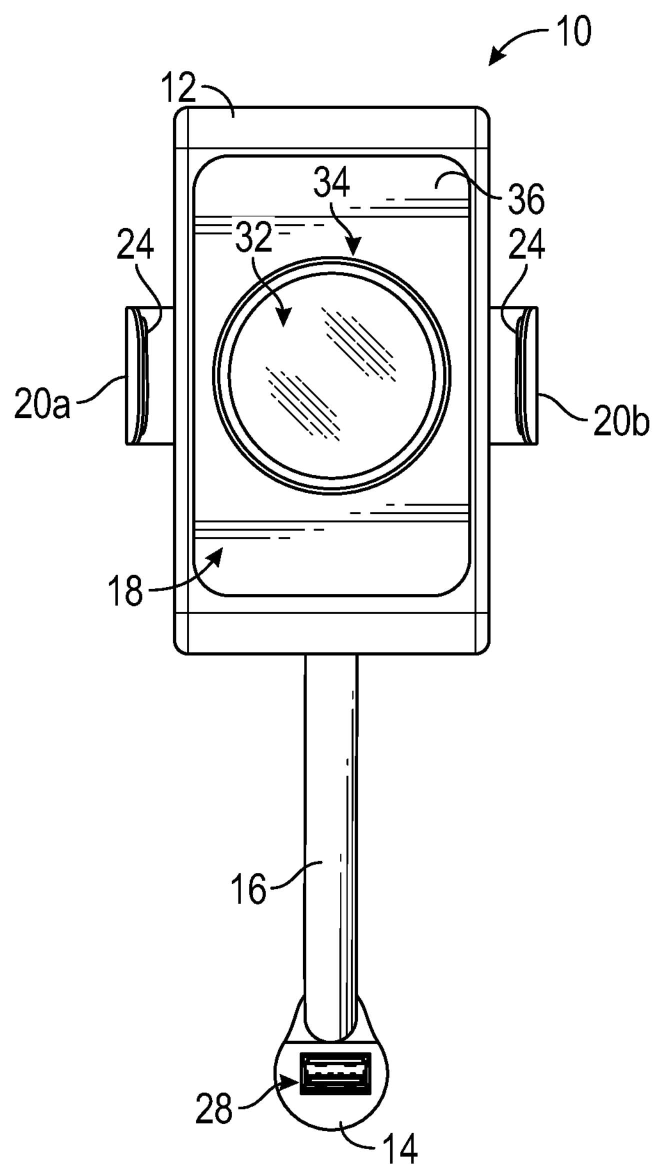
FIG. 2 shows a planar front view of the portable charger and cradle assembly of FIG. 1.
Figure 10:
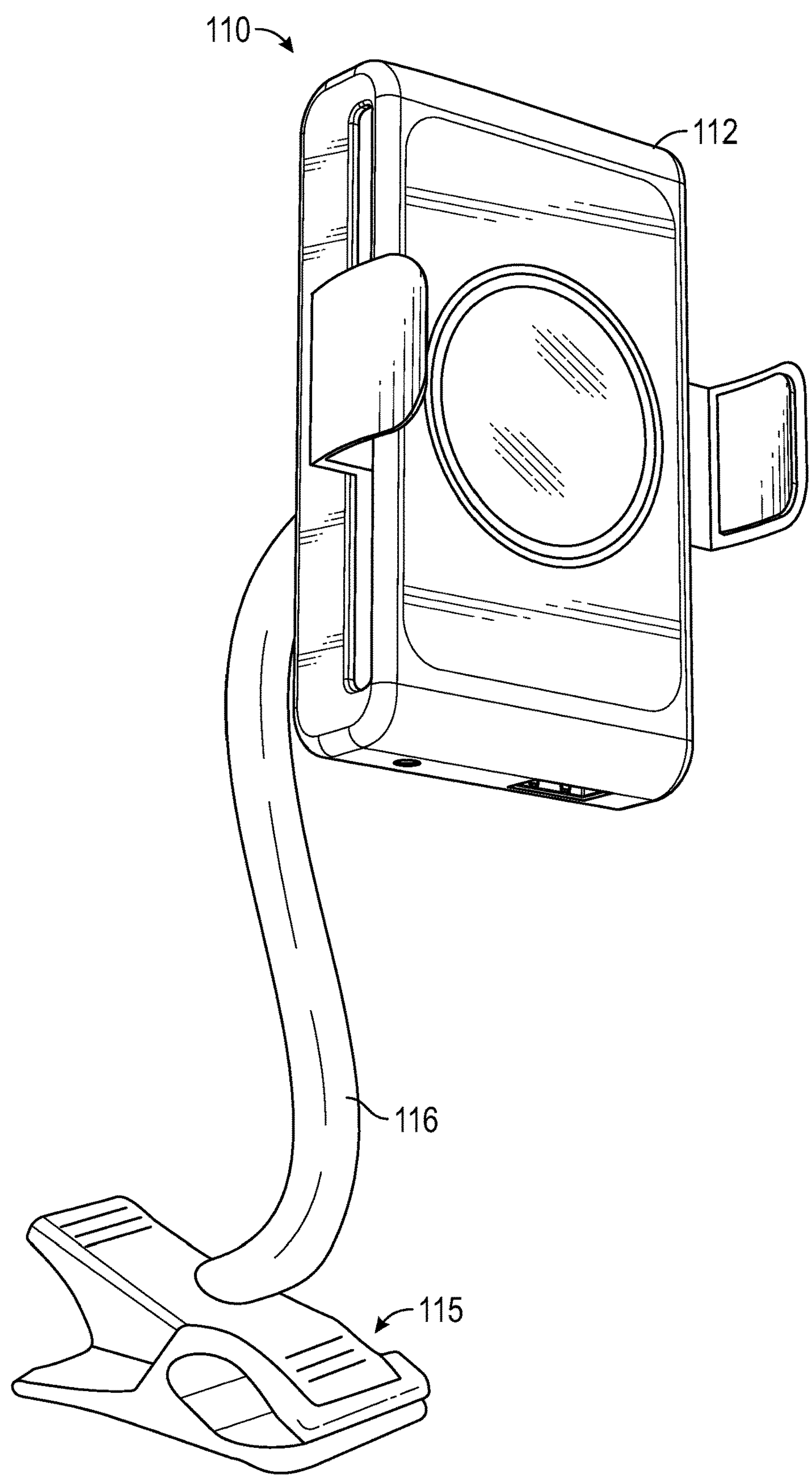
FIG. 10 shows a perspective view of a second embodiment of a portable charger and cradle assembly in accordance with the present invention.

The support member 16 is preferably flexible so as to permit adjustment of the position, angle and location of the cradle housing 12 once in place. In alternate embodiments, the support member 16 can be rigid, or comprise multiple rigid members connected by pivots. As illustrated, for example in FIG. 5, the support member 16 includes a first end attached to the cradle housing 12 and a second end which can be provided with a power connection interface, such as car charger interface 14 as illustrated, for coupling with a complementary power connection interface, or alternatively, a mounting means, such as a clip, a magnet assembly, a suction cup, a weighted base, or the like, as illustrated in FIG. 10, for securing the second end of the support member 16 to a surface. In this regard, the support member 16 of the present invention can be adapted to be coupled to a power source, or merely be used to prop up the cradle housing 12 for desired use. A power connection port 26 can be provided on the support member 18, for example, on the power connection interface, as illustrated in FIG. 2, for directly connecting the portable charger and cradle assembly 10 with a power source, an electronic device, or both.

As noted, the portable charger and cradle assembly 10 can be used to recharge one or more portable electronic device in a variety of manners, including via direct connection with an electronic device via a power output connector interface provided with the charger, such as via a separate connector cable that engages a power connection port 26 provided on the cradle housing (FIG. 8) and/or a power connection port 28 on the end of the support member 18 (FIG. 2), or via wireless power transmission means contained within the cradle housing 12. In alternate embodiments, the cradle housing can also include a charging cable that is attached to the housing and operatively connected with the internal battery unit and/or the car charger interface 14, and preferably storable within a storage cavity formed in the cradle housing 12, much like illustrated and described in Applicants' U.S. Pat. No. 9,318,915, incorporated herein by reference. A portable power charger and cradle assembly 10 in accordance with the present invention can include any or all of these recharging features in various combinations without departing from the principles and spirit of the present invention.

In preferred embodiments, each of the cradle housing 12 and the car charger interface 14 include power connection ports 26 and 28, respectively, for permitting direct connection to the charger and cradle assembly 10. In this manner, multiple devices can be connected to the assembly 10 at the same time, and as a result, can all be charged from the car charger socket, when connected and providing a charge, or from the internal battery of the charger 10, when provided. As illustrated, the power connection ports 26 and 28 are USB ports; however, various port designs can be used without departing from the spirit and principles of the present invention. The power connection ports can be of the two-way charging type described in Applicants' co-pending U.S. patent application Ser. No. 13/682,985, which is incorporated herein by reference.

Still further, the cradle housing 12 can include charger cables housed within cavities formed in the cradle housing 12 that can be removed for connection to additional electronic devices, or which may be used for direct connection with an electronic device supported by the cradle 10 which may not have the appropriate wireless charging components.

Figure 9:
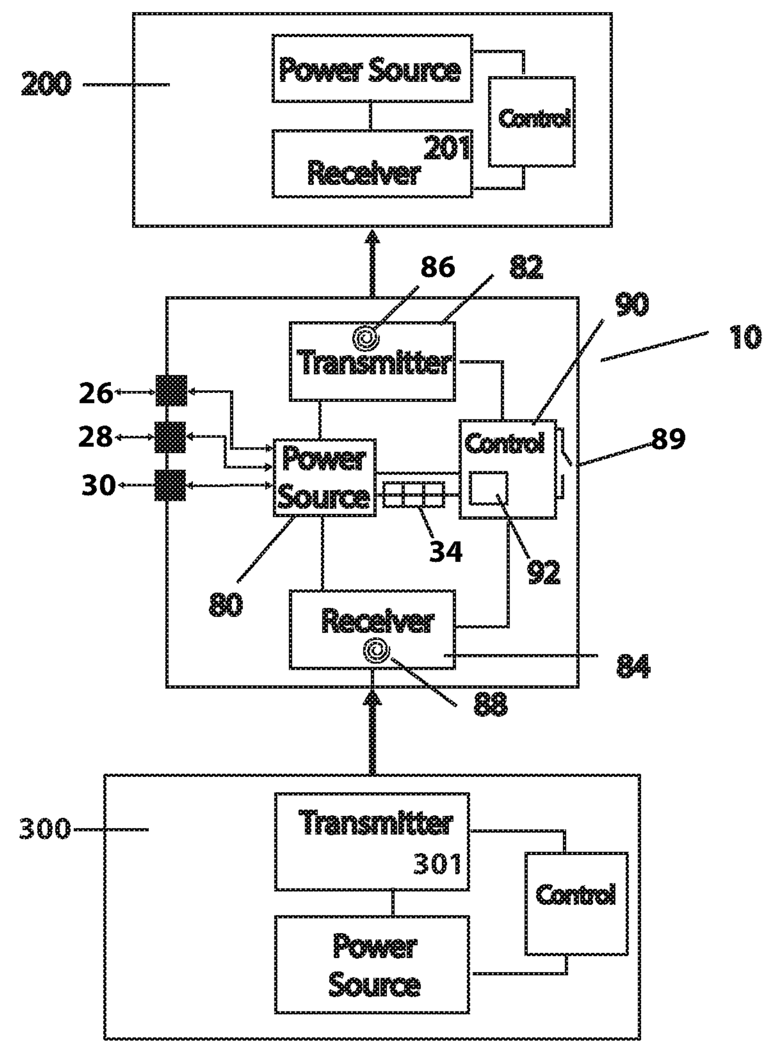
FIG. 9 illustrates a block diagram of a charging system in accordance with FIG. 1 and other embodiments of the present invention including a wireless power transmission device, a portable charger and cradle assembly in accordance with FIG. 1, and an electronic device to be charged.

As illustrated in FIG. 9, the cradle housing 12 also include an audio port 30 for connecting headphones to the cradle 10, whereby a user can switch a phone mounted on the cradle housing 12 into a privacy mode via the wireless connection components.

As noted above, the portable charger and cradle assembly 10 is equipped with components for wireless power transmission to an electronic device mounted in the cradle. In this regard, and referring to FIG. 9, the assembly 10 includes a wireless transmitter 82 for transmitting a charge to an electronic device, and, in additional embodiments, may further include a wireless receiver 84 for receiving a charge from a wireless charging mat or other known wireless power transmitting device, generally designated in FIG. 9 by reference numeral 300.

The wireless transmitter 82 of the power charger and cradle assembly 10 generally comprises at least one magnetic induction coil 86 operatively connected to the car charger interface 14 and/or the internal battery unit 80. Referring to FIGS. 1 and 2, a wireless transmission area 32 generally aligned with the transmitter coil 86 is illustrated. When an electronic device 200 that includes a wireless receiver 201 is aligned with the wireless transmission area 32, a magnetic field generated by the transmitter 82 is transmitted to the electronic device 200, where a voltage is induced to power the electronic device or recharge its internal battery. In this regard, the designated wireless transmission area 32 is visible to the user so as to facilitate proper alignment and wireless charging. In preferred embodiments, the entire support surface 18 of the cradle housing 12 acts as the wireless transmission area 32 with a circle designating the center of the area 32. A power indicator 34 may be provided to indicate that a charge is available for wireless recharging and/or that an electronic device is being wirelessly charged from the power charger 10. As illustrated in FIG. 1, the power indicator 34 is an annular LED light surrounding the wireless transmission area 32.

Operation of the power charger and cradle assembly 10 to transmit a wireless charge to an electronic device via the wireless transmitter 82 may be controlled by a power interface, such as an on/off button, designated in FIG. 9 as switch 89. Power capacity indicator means may also be provided to indicate the capacity of the internal battery unit, if included.

In embodiments of the present invention including a wireless receiver 84, the receiver 84 would likewise generally comprise at least one magnetic induction coil 88 operatively connected to the internal battery unit 80. To recharge the internal battery unit 80 of the portable charger and cradle assembly 10, the assembly 10 can be placed in wireless communication with a wireless power transmission device 300 with an appropriate wireless transmitter 301, such as a wireless charging mat as is generally known in the art. When the assembly 10 is placed in communication with a wireless transmission device 300 with the wireless reception area generally aligned with the transmitter 301 of the transmission device 300, a magnetic field generated by the transmitter is transmitted to the wireless receiver 84 of the assembly 10. A voltage is induced in the receiver coil 88, which voltage can be used to power the assembly 10 so long as it remains aligned with the transmission device or used to recharge its internal battery 80 for future use away from the wireless transmission device 300. Though not shown, a separate power indicator may be provided on the cradle housing 12 to indicate that the power charger and cradle assembly 10 is being wirelessly charged from a wireless transmission device 300. Alternatively, the power indicator 34, shown in FIG. 1, can be used to indicate both when the power charger 10 is being charged from a wireless transmission device 300 and when the charger 10 is being used to charge other devices.

As with known wireless power transmission devices, such as wireless charging mats ascribing to wireless charging standardization efforts, the wireless transmitter of a charging device and the wireless receiver of a device to be charged typically must be aligned for the charge to be transferred. In this regard, the support surface 18 of the cradle housing 12 may include a rubber tack pad 36 to ensure sufficient friction between the surface 18 and the electronic device so that there is a reduced risk of the device slipping and becoming misaligned while it is recharging, such as when the car is moving. As noted, adjustable spring-biased clip-arms **20*a* and 20*b* with similar tack pads 24 are provided to hold the electronic device securely to the cradle 10** to ensure efficient charging of the device.

The wireless charging capabilities of the power charger and cradle assembly 10 in accordance with the present invention are beneficial in that they improve upon the convenience provided by wireless charging technology. For example, a portable electronic device can be recharged on-the-go even when the proper charging connector or cable is not available. Indeed, the compact and portable design of the power charger and cradle assembly 10 can permit charging of an electronic device in the user's purse or briefcase simply be ensuring the electronic device is properly aligned with and proximate to the power charger. Additionally, once the power charger and cradle assembly 10 is charged, a portable electronic device can be recharged without needing to be connected to the car charging socket or with the car running.

The power charger and cradle assembly 10 of the present invention also permits wireless power transmission technology to be used to recharge multiple devices at the same time regardless of the available space on a wireless transmission area 32. For example, the power charger and cradle assembly 10 of the present invention also has the capability of charging other devices or being recharged itself via direct connections, either using connector cables provided with and stored in the cradle housing, or via separate connector cables attachable to the charger and cradle via power connection ports provided on the cradle housing and/or the car charger interface. In this regard, the portable charger and cradle assembly 10 can be used on-the-go to charge one or more electronic devices by various means and combination of means. Thus, the assembly 10 can be recharged either wirelessly or via direct connection to an external power source, and at the same time be connected to multiple electronic devices by both wireless and direct connection means. Similarly, the assembly 10 can be connected to multiple electronic devices by both wireless and direct connection means.

In preferred embodiments of the present invention, the charger and cradle assembly 10 can be automatically turned on when the car charger interface 14 is inserted into a car charging socket. Further, the assembly 10 can use a power-off logic that automatically turns the assembly 10 off after a predesignated time period, provided certain criteria have been met. Such a protocol is described in co-pending U.S. application Ser. No. 13/682,985, with is incorporated herein by reference, whereby the assembly 10 will automatically turn off after a predefined time delay after it is determined that the internal battery of all electronic devices connected to the assembly 10, either directly or wirelessly, are fully charged. Additionally, a manual power interface, such as an on/off button, can be provided to turn the assembly 10 on and off as desired.

In preferred embodiments and where provided, the rechargeable battery unit 80 is preferably a Lithium-Ion battery that can be recharged by connecting the power charger and cradle assembly 10 to an external power source, namely, a car charging socket via the car charger interface 14 or some other source via one of the power connection ports 26 or 28, or to a wireless power transmission device, such as a wireless charging mat via the wireless receiver 84. The rechargeable battery unit 80 is preferably disposed within the cradle housing 12 and can be operatively connected with the car charger interface 14, a wireless receiver 84, a power input connector cable (not shown), and a power input connection port 26 or 28 for recharging the battery 80 when the charger unit 10 is directly connected with a car charging socket, wirelessly connected to a wireless charging mat, or directly connected to another external power source via a power input means. The rechargeable battery unit 80 is also operatively connected with the wireless transmitter 82, power output connector cables (not shown), and power output connection ports 26 or 28 for transmitting a charge to one or more electronic devices connected to the power charger, either wirelessly or through power output means.

In an alternate embodiment of the present invention, the portable charger and cradle assembly 10 need not have an internal rechargeable battery. Instead, the wireless transmitter 82 can be operatively connected with the car charger interface 14, the power connection ports 26 and 28, or any charging cables provided on the charger housing 12 (not shown), and provide charging capabilities when the portable charger and cradle assembly 10 is coupled to an external power source providing a charge via the car charger interface 14 or the power connection ports 26 or 28, or any charging cables provided with the assembly 10. A second power indicator 38, illustrated in FIG. 1, can be provided on the power connection interface to indicate when a charge is being supplied to the assembly 10 from an external power source.

The cradle housing 12 encloses various electrical components (such as integrated circuit chips and other circuitry) to provide computing operations for the device. The integrated circuitry and other components may comprise a power supply (e.g., the internal rechargeable battery), a microprocessor and controller (e.g., a CPU), memory (e.g., ROM, RAM, flash), a circuit board, a hard drive, and/or various input/output (I/O) support circuitry. The electrical components may also include components for sending and receiving data and media (e.g., antenna, receiver, transmitter, transceiver, etc.), in addition to wireless transmission of power, as discussed above.

The charger and cradle assembly 10 also comprises a controller 90, including a processing unit 92, configured to execute instructions and to carry out operations associated with the charger unit 10. For example, the processing unit 92 can control wireless operation of the charger 10 when the transmitter 82 and/or receiver 84 are aligned with respective receivers and transmitters, keep track of the capacity level of the internal battery unit 80, store data or provide a conduit means by which data can be exchanged between electronic devices, such as between a smart phone and a computer. For example, the processing unit 92 communicates with the battery unit 80 to determine how much capacity is remaining in the battery 80. Upon determining the capacity level, the processing unit 92 may communicate with power indicator means to provide the user with the appropriate signal for showing how much capacity is remaining in the internal rechargeable battery unit 80.

For wireless charging, the controller utilizes control circuitry operatively connected with the induction coils 86 and 88 of the wireless transmitter 82 and wireless receiver 84, respectively. In accordance with known designs for the Qi wireless charging standard, devices capable of being charged wirelessly often include a chip or other suitable component for directing power to a battery. Control circuitry in such devices detect when such chips or components are aligned so that power can be transmitted and received. In the charger and cradle assembly 10 of the present invention, the transmitter induction coil 86 generates an electromagnetic field when power is applied thereto—for example, from the internal battery 80 or directly from an external power source. The control circuitry senses when current is being drawn by a receiver (for example, in a portable electronic device 200 aligned with the transmitter 82 of the assembly 10). When a current is being drawn, the processing unit 92 can control the voltage and/or current supplied from the battery unit 80 to the transmitter 82 so that the electromagnetic filed generated by the transmitter magnetic induction coil 86 will efficiently induce appropriate voltage and current in the receiver 201 of the device 200 being charged. Similarly, the control circuitry senses when a current is available to be drawn by the wireless receiver 84 (for example, when the assembly 10 is properly positioned on a wireless charging mat 300). When an electromagnetic field is detected, the processing unit 92 can control the power received by the receiver magnetic induction coil 88 and regulate/convert the power into an appropriate voltage and current for recharging the battery unit 80.

In an alternate embodiment of the present invention, as illustrated in FIG. 10, a portable charger and cradle assembly 110 is shown having a cradle housing 112 supported by a flexible support member 116 attached at one end to the cradle housing 112 and at the other end to a clip 115 for securing the second end of the support member 116 to a surface. Though illustrated as a clip 115, the second end of the support member 116 can include any means for mounting the charger and cradle assembly 110 to a support surface, including but not limited to a magnet assembly, a suction cup, a weighted base, or the like. Indeed, a power connection interface, such as the car charger interface 14 illustrated in FIG. 1, also generally acts as a mounting means in this regard for securing the second end of the support member 116 to a surface—even through a complementary interface such as a car charger socket. In the design illustrated in FIG. 10, the portable charger and cradle assembly 110 could be mounted in the car for charging an electronic device while on-the-go, or alternatively, be used at a desk or table for charging electronic devices in another location utilizing the wireless and direct charging capabilities of the assembly 110.

The foregoing description of embodiments of the present invention has been presented for the purpose of illustration and description. It is not intended to be exhaustive or to limit the invention to the form disclosed. Obvious modifications and variations are possible in light of the above disclosure. The embodiments described were chosen to best illustrate the principles of the invention and practical applications thereof to enable one of ordinary skill in the art to utilize the invention in various embodiments and with various modifications as suited to the particular use contemplated.

What is claimed is:

1. A cradle for holding an electronic device and for providing a charge to said electronic device, said cradle comprising:

- a cradle housing for supporting the electronic device having a generally flat support surface against which the electronic device may be held;
- a wireless transmitter disposed in said cradle housing capable of transmitting a power to the electronic device when said device is being supported on the support surface of the cradle housing;
- a support member for supporting the cradle housing;
- a first arm coupled to the cradle housing; and
- a second arm coupled to the cradle housing,
- wherein the first and second arms are adapted for lateral movement relative to one another and wherein further each of said first and second arms is adapted for adjustable movement to a plurality of positions along a longitudinal length of the cradle housing for holding the electronic device when said device is being supported on the support surface of the cradle housing.

2. The cradle according to claim 1, further comprising a rechargeable battery unit disposed in the cradle housing and operatively connected to the wireless transmitter.

3. The cradle according to claim 2, wherein the wireless transmitter includes at least one magnetic induction coil operatively connected to the rechargeable battery unit.

4. The cradle according to claim 2, further comprising a processing unit operatively connected to the rechargeable battery unit and the wireless transmitter, wherein the processing unit is configured to direct power from the rechargeable battery unit to the wireless transmitter to wirelessly recharge the electronic device in wireless communication with the cradle.

5. The cradle according to claim 2, further comprising a wireless receiver operatively connected to the rechargeable battery unit for receiving power transmitted from an external wireless transmitting device and directing said power to the rechargeable battery unit for recharging.

6. The cradle according to claim 5, wherein said wireless transmitter comprises a first magnetic induction coil assembly and said wireless receiver comprises a second magnetic induction coil assembly, each of said coil assemblies being operatively connected with the rechargeable battery unit.

7. The cradle according to claim 5, further comprising a processing unit operatively connected to the rechargeable battery unit, the wireless transmitter and the wireless receiver, wherein the processing unit is configured to direct a power from the rechargeable battery unit to the wireless transmitter to wirelessly recharge the electronic device in wireless communication with the cradle, and wherein further the processing unit is configured to direct power from the wireless receiver to the rechargeable battery unit when the cradle is in wireless communication with the external wireless transmitting device.

8. The cradle according to claim 2, further comprising a power connection port on the cradle housing, said power connection port being operatively connected with at least one of the rechargeable battery unit and the wireless transmitter.

9. The cradle according to claim 1, wherein the support member is adapted to be coupled to an external power source, wherein, when said support member is coupled to said external power source, a charge is provided from said external power source to the wireless transmitter.

10. The cradle according to claim 9, wherein said support member has a first end attached to the cradle housing and a second end having a car charger interface, said external power source being a car charger socket so that when the car charger interface is coupled with the car charger socket, a charge is supplied from the car charger socket to the wireless transmitter via the car charger interface.

11. The cradle according to claim 10, wherein the second end further comprises a power connection port in operative connection with at least one of the car charger interface and the wireless transmitter.

12. The cradle according to claim 10, wherein the support member is flexible.

13. The cradle according to claim 1, wherein the support member has a first end attached to the cradle housing and a second end having mounting means for securing the second end of the support member to a surface.

14. The cradle according to claim 13, wherein the mounting means comprises a clip.

15. The cradle according to claim 1, further comprising retaining means for retaining the first and second arms in a clamping position.

16. The cradle according to claim 1, wherein the cradle housing includes grooves on each lateral side and said first and second arms are disposed within the grooves for sliding adjustment within the grooves along the longitudinal length of the housing.

17. A cradle for holding an electronic device and for providing a charge to said electronic device, said cradle comprising:

- a cradle housing for supporting the electronic device having a generally flat support surface against which the electronic device may be held;
- a rechargeable battery unit disposed within the cradle housing;
- a wireless transmitter disposed in said cradle housing and operatively connected to the rechargeable battery unit, said wireless transmitter being capable of transmitting a power to the electronic device when said device is being supported on the support surface of the cradle housing;
- a flexible support member for supporting the cradle housing;

a first arm coupled to the cradle housing; and a second arm coupled to the cradle housing, wherein the first and second arms are adapted for lateral movement relative to one another and wherein further each of said first and second arms is adapted for adjustable movement to a plurality of positions along a longitudinal length of the cradle housing for holding the electronic device when said device is being supported on the support surface of the cradle housing.

18. The cradle according to claim 17 wherein the wireless transmitter includes at least one magnetic induction coil operatively connected to the rechargeable battery unit.

19. The cradle according to claim 17, further comprising a processing unit operatively connected to the rechargeable battery unit and the wireless transmitter, wherein the processing unit is configured to direct power from the rechargeable battery unit to the wireless transmitter to wirelessly recharge the electronic device in wireless communication with the cradle.

20. The cradle according to claim 17 further comprising a wireless receiver operatively connected to the rechargeable battery unit for receiving power transmitted from an external wireless transmitting device and directing said power to the rechargeable battery unit for recharging.

21. The cradle according to claim 20, wherein said wireless transmitter comprises a first magnetic induction coil assembly and said wireless receiver comprises a second magnetic induction coil assembly, each of said coil assemblies being operatively connected with the rechargeable battery unit.

22. The cradle according to claim 20, further comprising a processing unit operatively connected to the rechargeable battery unit, the wireless transmitter and the wireless receiver, wherein the processing unit is configured to direct a power from the rechargeable battery unit to the wireless transmitter to wirelessly recharge the electronic device in wireless communication with the cradle, and wherein further the processing unit is configured to direct power from the wireless receiver to the rechargeable battery unit when the cradle is in wireless communication with the external wireless transmitting device.

23. The cradle according to claim 17, further comprising a power connection port on the cradle housing, said power connection port being operatively connected with at least one of the rechargeable battery unit and the wireless transmitter.

24. The cradle according to claim 17, wherein the support member is adapted to be coupled to an external power source, wherein, when said support member is coupled to said external power source, a charge is provided from said external power source to the rechargeable battery unit.

25. The cradle according to claim 24, wherein said support member has a first end attached to the cradle housing and a second end having a car charger interface, said external power source being a car charger socket so that when the car charger interface is coupled with the car charger socket, a charge is supplied from the car charger socket to the wireless transmitter via the car charger interface.

26. The cradle according to claim 25, wherein the second end further comprises a power connection port in operative connection with at least one of the car charger interface and the wireless transmitter.

27. The cradle according to claim 17, wherein the support member has a first end attached to the cradle housing and a second end having mounting means for securing the second end of the support member to a surface.

28. The cradle according to claim 27, wherein the mounting means comprises a clip.

29. The cradle according to claim 17, further comprising retaining means for retaining the first and second arms in a clamping position.

30. The cradle according to claim 17, wherein the cradle housing includes grooves on each lateral side and said first and second arms are disposed within the grooves for sliding adjustment within the grooves along the longitudinal length of the housing.

31. A cradle for holding an electronic device and for providing a charge to said electronic device, said cradle comprising:

a cradle housing for supporting the electronic device having a support surface against which the electronic device may be held;

a wireless transmitter disposed in said cradle housing capable of transmitting a power to the electronic device when said device is being supported on the support surface of the cradle housing;

a power connection interface in operative connection with the wireless transmitter and adapted to be coupled with an external power source and for providing the power to the wireless transmitter when said power connection interface is coupled to the external power source;

a support member for supporting the cradle housing;

a first arm coupled to the cradle housing; and a second arm coupled to the cradle housing, wherein the first and second arms are adapted for lateral movement relative to one another and wherein further each of said first and second arms is adapted for adjustable movement to a plurality of positions along a longitudinal length of the cradle housing for holding the electronic device when said device is being supported on the support surface of the cradle housing.

32. The cradle according to claim 31, wherein the support member has a first end attached to the cradle housing and a second end extending away from the cradle housing, and wherein the power connection interface comprises a car charger interface, said external power source being a car charger socket so that when the car charger interface is coupled with the car charger socket, a charge is supplied from the car charger socket to the wireless transmitter via the car charger interface.

33. The cradle according to claim 31, wherein the power connection interface comprises a power connection port operatively connected with the wireless transmitter.

* * * * *